United States Patent Office 3,253,004
Patented May 24, 1966

3,253,004
17α-HALO-HYDROCARBON-ESTRATRIENE 3,17-DIOLS
John Fried, Plainfield, and Thomas S. Bry, Linden, N.J., assignors to Merck & Co., Inc., Rahway, N.J., a corporation of New Jersey
No Drawing. Filed July 1, 1963, Ser. No. 292,096
4 Claims. (Cl. 260—397.5)

This invention relates generally to estradiol derivatives. More particularly, it relates to estradiols which are substituted at the 17α-position with a halogenated hydrocarbon side chain containing a maximum of three carbon atoms and with 3-ethers and 17-esters of these novel compounds. The invention also includes within its scope processes by which the compounds may be prepared. Compounds of this invention possess useful properties as estrogenic agents.

Compounds within the scope of this invention may be represented by the formula:

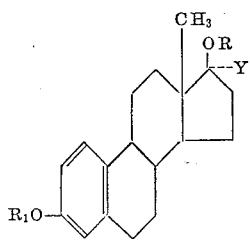

wherein Y is a halogenated hydrocarbon side chain containing from two to three carbon atoms such as trifluorovinyl; 1′,2′,2′-trifluoroethyl; trifluoropropynyl; 3′,3′,3′-trifluoropropenyl; 3′,3′,3′-trifluoropropyl or haloethynyl such as chloro- or bromoethynyl; R is hydrogen or an acyl radical for example a lower hydrocarbon carboxylic acyl radical such as benzoyl, acetyl, propionyl, butyryl, caprylyl or the like. $R_1$ is hydrogen, an acyl radical preferably identical with R or a hydrocarbon or substituted hydrocarbon substituent as for example aliphatic or substituted aliphatic radical or alkyl or aralkyl, more particularly, a methyl, ethyl, butyl, amyl or benzyl; a cycloaliphatic or cycloalkyl grouping such as cyclopentyl, cyclohexyl or the like.

Compounds useful in the presently preferred process for preparing the novel products of this invention include 3-hydroxy-estra-1,3,5(10)-triene-17-one also known as estrone and the 3-ethers thereof which may be represented by the formula:

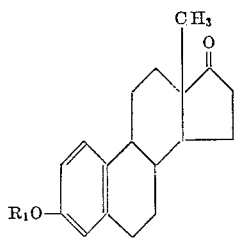

wherein $R_1$ has the same meaning as above. Estrone itself and many of its 3-ether derivatives are known. Others are readily prepared for example by reaction of estrone with the appropriate sulfate or halide under alkaline conditions. For example, estrone may be treated with a sulfate such as dimethyl sulfate in an aqueous alkaline medium to produce 3-methoxy estrone. The compound 3-benzyloxy-estrone may be prepared for example by reacting the steroid substrate in an inert organic solvent such as an aromatic hydrocarbon solvent, more particularly benzene or toluene with a halide such as benzyl chloride in the presence of an alkali metal hydride such as sodium hydride.

The general procedure by which certain of the compounds of this invention are prepared is a nucleophilic addition of unsaturated hydrocarbon Grignard or other organometallic hydrocarbon to the 17-oxo group of the estrone molecule. The reaction is carried out in an inert organic solvent. Other compounds of the invention are prepared by hydrogenation of the addition compounds thus produced. It is preferred to carry out nucleophilic addition reactions with compounds in which the active hydrogen of the 3-hydroxyl group on the estrone molecule is converted to an ether since the active hydrogen unnecessarily destroys some of the organometallic compound. Thus, it is preferred to form an ether and to react the ether with the organometallic compound. However, it is not necessary to do so since an excess of the organometallic compound can be used and the reaction product of the 3-hydroxyl group and the organometallic compound destroyed by the addition of acid during the work-up of the product.

Reaction of estrone or an ether of estrone with a haloethyne forms the corresponding 17α-haloethyne compound which may be represented by the following formula wherein $R_1$ has the same meaning as above and Z is a haloethyne radical:

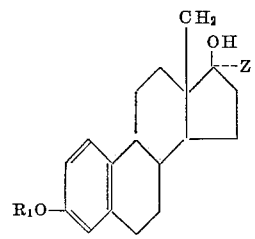

In a preferred embodiment of this procedure, the haloethyne is formed in situ by the reaction of 1,2-dichloroethylene (preferably in the cis form) with methyl lithium in an inert organic solvent. For example, 17α-chloroethynyl-3-methoxy-estra-1,3,5(10)-trien-17-ol is prepared by adding a solution of cis-1,2-dichloroethylene in ether to a solution of methyl lithium at about 0° C. in ether, stirring the mixture under nitrogen for one to two hours, adding the steroid substrate and stirring the resulting mixture for several hours longer. An inert atmosphere is not essential but it helps to minimize side reactions.

It has been found that the above starting materials will react with trifluorovinyl magnesium bromide to form 17α-trifluorovinyl-estra-1,3,5(10)-triene-3,17-diol or its ethers. These compounds may be reduced by catalytic hydrogenation using a noble metal catalyst such as platinum oxide in an inert organic solvent such as ethanol or other lower alkanol to produce the corresponding 17α-(1′,2′,2′-trifluoroethyl) compounds. The trifluorovinyl compounds and their reduction products are represented by the following formulas in which $R_1$ has the same meaning as above:

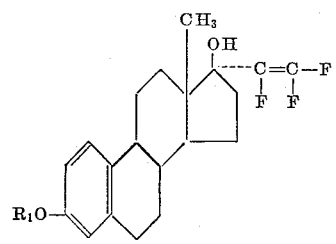

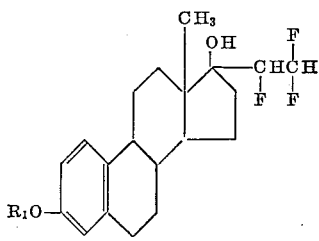

The trifluoropropynyl substituent is introduced at the 17α-position of the compounds of this invention by reaction of the corresponding 17-oxo compound with trifluoropropyne previously treated with ethyl magnesium bromide. The products may be reduced to 17α-(3',3',3'-trifluoropropenyl) compounds by catalytic reduction by using a Lindlar catalyst (lead deactivated palladium on calcium carbonate) at an elevated pressure. Alternatively, they may be completely reduced using a noble metal catalyst for example platinum oxide to produce compounds having a 17α-(3',3',3'-trifluoropropyl) substituent. Trifluoropropynyl compounds and their reduction products are represented by the following formulas in which $R_1$ has the same meaning as above:

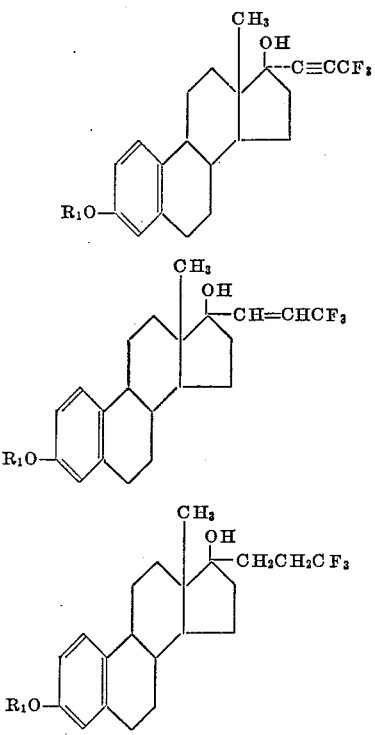

Both 3-esters and 17-esters of the compounds of this invention whether or not the acyl groups are identical are readily prepared taking advantage of the differing rates of esterification of the phenolic group at the 3-position and the hindered tertiary hydroxyl group at the 17β-position and the differing rates of hydrolysis of the esters thus produced. In general, the esters are prepared by reaction between the steroid substrate and the acylating agent for example an alkanoic acid anhydride or alkanoyl halide in the presence of a tertiary amine such as pyridine. The phenolic ester forms quite readily by simply allowing the reactants to stand at room temperature for several hours, e.g. ten to twenty hours. Formation of the 17-ester takes place with the same reactants but requires more rigorous conditions for example at least five hours at a temperature of at least 90° C. Thus, if desired, nonsymmetrical diesters can be prepared by first esterifying the phenolic hydroxyl group and thereafter esterifying the tertiary hydroxyl group. Alternatively, a symmetrical diester can be prepared under conditions which will form the 17-acylate but using sufficient reagent so that the 3-acylate is formed concurrently.

The 3-ester is more readily hydrolyzed than 17-ester and advantage can be taken of the differing rates of hydrolysis to form a 17-acylate 3-ol. In a preferred embodiment of this procedure, the diesters are taken up in a polar solvent containing a catalytic amount of acid and the mixture allowed to stand for several hours at room temperature. For example, the diacetate can be taken up in methanol containing a small amount of p-toluenesulfonic acid and allowed to stand at room temperature for 16 hours. The resulting 17-acetate is precipitated by pouring the mixture into ice water. It may be recovered by filtration and purified chromatographically.

The compounds of this invention are estrogenic agents useful because of their estradiol-like properties and are utilized in the treatment of the same physiological conditions. When administered therapeutically, they may be administered alone or associated with a pharmaceutical carrier, the choice of which will depend upon the properties of the active compound and standard pharmaceutical practice. Generally, the compound is administered in dosages of the same order of magnitude as other estrogenic compounds such as ethynylestradiol and dosage units may take the form of tablets, powders, capsules, elixirs or syrups which are particularly useful for oral ingestion. Liquid diluents are employed in sterile condition for parenteral use.

The following examples are given by way of illustration only and are not intended as limitations of this invention, many apparent variations of which are possible without departing from the spirit and scope thereof.

The first two procedures given below relate to the preparation of starting compounds:

PREPARATION I 3-methoxy-estra-1,3,5(10)-trien-17-one

Twenty grams of estrone and 100 g. of potassium hydroxide in one liter of water are heated to boiling with stirring. The resulting solution is cooled to 10° to 15° C. and 100 ml. of dimethyl sulfate is slowly added while stirring continues. The mixture is stirred for an additional three hours at approximately 10° C. It is then heated to boiling and held at the boiling point for 15 minutes. The mixture is filtered while hot and the precipitate washed with water, dried and taken up in benzene. The benzene solution is clarified with activated charcoal, filtered and the product recovered by removal of the solvent, M.P. 168–172° C.

Various other ethers including methyl, propyl, butyl, amyl and cyclopentyl ethers are similarly prepared from the same starting material.

PREPARATION II 3-benzyloxy-estra-1,3,5(10)-trien-17-one

Twelve grams of benzyl chloride is taken up in 600 ml. of benzene and 100 ml. of the solvent is distilled off to remove water. There is then added 2.3 g. of sodium hydride in small increments followed by 24.5 g. of estrone and the mixture is heated in reflux for 16 hours. The mixture is then washed several times with water, the organic layer dried, clarified with charcoal and filtered. The desired product is obtained by removal of the solvent.

Other ethers such as the p-methyl-benzyl, cyclohexyl and propyl ethers are similarly prepared in inert solvents such as toluene or xylene at temperatures of from 75° to 125° C. for from 8 to 16 hours.

EXAMPLE I

17α-chloroethynyl-3-methoxy-estra-1,3,5(10)-trien-17-ol

A solution of 3.4 grams (2.64 ml.) of cis-1,2-dichloroethylene in 10 ml. of sodium dried over ether is added over one-half hour at 0° C. to 6 ml. of a 1.4 N solution of methyl lithium (prepared by adding lithium to methyl iodide in dried ether solution under nitrogen at about 10° C.) in 50 ml. of sodium dried ether. The reaction mixture under nitrogen is stirred for an additional two hours and 100 mg. of 3-methoxy-estra-1,3,5(10)-trien-17-one in 10 ml. of sodium dried ether added over a 20 minute period. The mixture is stirred for approximately 15 hours, poured into ice water, filtered and the precipitate extracted with ether. The ether extracts are washed with water, dried over an anhydrous sodium sulfate, filtered and the solvent removed. The residue is chromatographed on basic alumina by charging with petroleum ether and eluting with mixtures of petroleum ether and ether to give the desired product.

The same procedure is used to prepare 17α-bromoethynyl-3-methoxy-estra-1,3,5(10)-trien-17-ol utilizing 1,2-dibromoethylene in place of 1,2-dichloroethylene. Similar procedures are used to prepare 17α-haloethyne-estra-1,3,5(10)-triene-3,17-diols as well as the 3-ethers utilizing starting compounds such as those prepared in accordance with Preparations I and II by mixing the reactants in an inert organic solvent preferably an ether at temperatures of from −5° C. to 10° C. for from 10 to 20 hours.

EXAMPLE II

*17α-trifluorovinyl-3-methoxy-estra-1,3,5(10)-trien-17-ol*

A solution of 1 gram of 3-methoxy-estra-1,3,5(10)-trien-17-one in 10 ml. of benzene containing an equal amount of ether is prepared by adding the steroid to 15 ml. of benzene, distilling off 5 ml. of solvent, cooling and adding the ether. To this mixture there is added 10 ml. of a tetrahydrofuran solution containing 0.1 m. of trifluorovinyl magnesium bromide and the mixture is stirred for approximately 16 hours at 20° to 30° C. It is then diluted with water and extracted with ether. The combined extracts are washed with water until the washings are weakly basic, dried over an anhydrous sodium sulfate, filtered and the solvent removed. The residue is chromatographed on basic alumina by charging with petroleum ether and eluting with mixtures of petroleum ether and ether to give the desired product.

Other 17α-trifluorovinyl derivatives of estra-1,3,5(10)-trien-3,17-ol as well as 3-ethers thereof are prepared utilizing starting compounds such as those prepared in accordance with Preparations I and II in inert organic solvents at temperatures of from 15° to 40° C. for from 8 to 20 hours.

EXAMPLE III

*17α-trifluoropropynyl-3-methoxy-estra-1,3,5(10)-trien-17-ol*

A 50 cc. three-neck round bottom flask is fitted with a Dry Ice condenser, a dropping funnel and a magnetic stirrer. After the addition of 210 mg. of magnesium, the entire system is swept with nitrogen and flame dried. Five ml. of dry ether is added to the magnesium and 1 ml. of ethyl bromide in 5 ml. of ether is added dropwise with stirring over 15 minutes. After all the magnesium has reacted, 5 ml. of trifluoropropyne (prepared by the reaction of propiolic acid with sulfur tetrafluoride) is distilled in and refluxed under Dry Ice-acetone for one hour. The reaction is then allowed to warm to room temperature, the excess gaseous trifluoropropyne being distilled off. A solution of 500 mg. of 3-methoxy-estra-1,3,5(10)-trien-17-one which is dried by azeotropic distillation from benzene, is added in 5 ml. of benzene and 5 ml. of dry ether. The reaction is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give the desired product.

Other 17α-trifluorovinyl derivatives of estra-1,3,5(10)-trien-3,17-ol as well as 3-ethers thereof are prepared utilizing starting compounds such as those prepared in accordance with Preparations I and II in inert organic solvents at temperatures of from 15° to 40° C. for from 8 to 20 hours.

EXAMPLE IV

*17α-(3′,3′,3′-trifluoropropenyl)-3-methoxy-estra-1,3,5(10)-trien-17-ol*

A solution of 100 mg. of the product prepared in the previous example and 100 mg. of Lindlar catalyst in 10 ml. of ethyl acetate is treated with hydrogen at 40 pounds per square inch pressure until one molar equivalent of hydrogen is absorbed. The mixture is filtered and concentrated. The desired product is obtained by chromatography of the crude product.

Other 17α-(3′,3′,3′-trifluoropropenyl)-estra-1,3,5(10)-triene-3-17-diol 3-ethers and the nonetherified product are similarly prepared utilizing the starting compounds prepared in accordance with the procedure of the previous examples at pressures of from 40 to 60 pounds per square inch in inert organic solvents at room temperature.

EXAMPLE V

*17α-(3′,3′,3′-trifluoropropyl)-3-methoxy-estra-1,3,5(10)-trien-17-ol*

A suspension of platinum oxide in 10 ml. of ethanol is prepared and 100 mg. of the product prepared in Example III is added. Reduction proceeds at atmospheric pressure until 2 molar equivalents of hydrogen are absorbed. The solution is filtered, concentrated and chromatographed on alumina to yield the desired product.

In accordance with the above procedure, 17α-(3′,3′,3′-trifluoropropyl)-estra-1,3,5(10)-triene-3,17-diol and 3-ethers thereof are similarly prepared utilizing as starting materials the compounds prepared by the procedure of Example III in an inert organic solvent at substantially atmospheric pressure and room temperature.

EXAMPLE VI

*17α-(1′,2′,2′-trifluoroethyl)-3-methoxy-estra-1,3,5(10)-trien-17-ol*

A suspension of platinum oxide in 20 ml. of ethanol is prepared and 200 mg. of the product prepared in Example II is added. Reduction proceeds at atmospheric pressure until one molar equivalent is absorbed. The solution is filtered, concentrated and chromatographed on alumina to yield the desired product.

In accordance with the above procedure 17α-(1′,2′,2′-trifluoroethyl)-estra-1,3,5(10)-triene-3,17-diol and 3-ethers thereof are similarly prepared utilizing as starting materials the compounds prepared by the procedure of Example II in an inert organic solvent at substantially atmospheric pressure and room temperature.

EXAMPLE VII

*17-acetoxy-3-methoxy-17α-trifluoropropynyl-estra-1,3,5(10)-triene*

One hundred mg. of the product prepared in Example III is heated with 1 ml. of acetic anhydride and 1.2 ml. of pyridine on the steam bath overnight. The reaction mixture is poured onto ice and extracted with chloroform. The extract is washed with water and concentrated. The concentrate is chromatographed over acid washed alumina and eluted with mixtures of petroleum ether and ether to give the desired product.

EXAMPLE VIII

*17-caprylyloxy-17α-trifluoropropynyl-estra-1,3,5(10)-triene*

One hundred mg. of the product prepared in Example III is heated with 1 ml. of caprylyl chloride and 1.2 ml.

of pyridine on the steam bath overnight. The reaction mixture is poured onto ice and extracted with chloroform. The extract is washed with water and concentrated. The concentrate is chromatographed over acid washed alumina and eluted with mixtures of petroleum ether and ether to give the desired product.

EXAMPLE IX

*17-acetoxy-17α-chloroethynyl-estra-1,3,5(10)-trien-3β-ol*

One hundred mg. of 3β,17-diacetoxy-17α-chloroethynyl-estra-1,3,5(10)-triene is taken up in 5 ml. of anhydrous methanol containing 4 mg. of p-toluenesulfonic acid and the mixture allowed to stand at room temperature for five hours. The acid is neutralized by the addition of concentrated aqueous sodium bicarbonate solution. The mixture is diluted with water and extracted twice with chloroform. The combined chloroform layers are dried over anhydrous sodium sulfate, filtered and the solvent removed in vacuo. The residue is chromatographed over acid washed alumina and eluted with mixtures of petroleum ether and ether to give the desired product.

EXAMPLE X

*3β-acetoxy-17α-trifluoropropynyl-estra-1,3,5(10)-trien-17-ol*

One hundred mg. of 17α - trifluoropropynyl - estra-1,3,5(10)-triene-3β,17-diol is taken up in a mixture containing 1 ml. of acetic anhydride and 1.2 ml. of pyridine. The mixture is allowed to stand at room temperature for five hours. It is then poured on ice and extracted with chloroform. The extract is washed with water and concentrated. The concentrate is chromatographed over acid washed alumina and eluted with mixtures of petroleum ether and ether to give the desired product.

The procedures of Examples VII, VIII, IX and X are used to prepare a variety of mono- and diesters of the compounds prepared by the procedures of Examples I through VI. Both symmetrical and nonsymmetrical diesters are prepared. These include mono- and di- acetates, propionates, butyrates, valerates, benzoates and phenyl acetates of bromo- and chloroethynyl; trifluorovinyl; 1',2',2'-trifluoroethyl; trifluoropropynyl; 3',3',3'-trifluoropropenyl and 3',3',3'-trifluoropropyl derivatives of estra-1,3,5(10)-triene-3,17β-diol as well as the 3-ethers of these compounds including methoxy, ethoxy, benzyloxy and cyclopentyloxy ethers.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group which consists of 17α-(1',2',2'-trifluoroethyl)-estra-1,3,5(10)-triene-3,17-diol and 17-acylate and the 3-alkyl ethers thereof.
2. 17α-(1',2',2'-trifluoroethyl) - 3-methoxy-estra-1,3,5-(10)-trien-17-ol.
3. A compound selected from the group which consists of 17α - (3',3',3' - trifluoroproply)-estra-1,3,5(10)-triene-3,17-diol and 17-acylate and the 3-alkyl ethers thereof.
4. 17α - (3',3',3' - trifluoropropyl) - 3 - methoxy-estra-1,3,5(10)-trien-17-ol.

References Cited by the Examiner

UNITED STATES PATENTS 3,100,204   8/1963   Oberster et al. _____ 260—239.55

OTHER REFERENCES

Burgess et al.: Jour. Chem. Soc. (1962), pages 4995–5004 relied on.

Fried et al.: Journal of Amer. Chem. Soc. (1961), vol. 83, pages 4663–4664 relied on.

LEWIS GOTTS, *Primary Examiner.*